106. COMPOSITIONS, COATING OR PLASTIC.

78

Patented May 29, 1923.

1,456,842

UNITED STATES PATENT OFFICE.

SAMUEL BUTTERMAN, OF CHICAGO, ILLINOIS, AND CHARLES K. COOPERRIDER, OF ALBUQUERQUE, NEW MEXICO, DEDICATED, BY MESNE ASSIGNMENTS, TO THE PEOPLE OF THE UNITED STATES FOR THEIR FREE USE AND ENJOYMENT.

PROCESS OF MANUFACTURING WATERPROOF ADHESIVES.

No Drawing. Application filed May 2, 1922. Serial No. 557,966.

(FILED UNDER THE ACT OF MARCH 3, 1883, 22 STAT. L., 625.)

*To all whom it may concern:*

Be it known that we, SAMUEL BUTTERMAN, a citizen of the United States, residing at Chicago, in the county of Cook and State of Illinois, and CHARLES K. COOPERRIDER, a citizen of the United States and an employee of the United States Department of Agriculture, residing at Albuquerque, in the county of Bernalillo and State of New Mexico, have invented jointly a new and useful Improvement in the Process of Manufacturing Waterproof Adhesives, of which the following is a specification.

This application is made under the act of March 3, 1883, chapter 143 (22 Stat., 625), and the invention herein described and claimed may be used by the Government of the United States, its officers and employees, and by any person in the United States either in public or private work without payment to us of any royalty thereon. We hereby dedicate the same to the free use of the Government and the people of the United States.

Our invention relates to the manufacture of waterproof adhesives which remain for relatively long periods without "setting," that is, remain in a workable condition. We have now found a way of making certain improvements in the process disclosed in Patent No. 1,291,396 granted to Samuel Butterman which consists of the employment by weight of approximately one (1) part casein, 1.5 to 2.8 parts water, .015 parts hydrocarbon oil, .15 parts powdered hydrated lime, depending on the purity of the lime, a lesser per cent being required when pure lime is used and a greater per cent when the lime is of inferior quality, mixed in .9 parts water and .7 parts silicate of soda. This process yields a glue which is very water-resistant. It has now been found possible, however, to make this glue still more water-resistant by adding to it a certain amount of cupric chloride. We have found that if three hundredths of a part of cupric chloride to every part of casein are added to the glue prepared according to the process described in Patent No. 1,291,396, a considerable improvement in water resistance will be brought about; but we do not wish to limit ourselves to the amount stated, as cupric chloride in any amount from one hundredth of a part to one-tenth of a part for each part of casein in the original casein glue can be used to advantage. We mention cupric chloride specifically; but do not wish to confine ourselves to cupric chloride only; for we have found that any copper salt that has a coagulating effect on casein glue will act similarly to copper chloride and increase the water-resisting qualities of the glue; and the chloride was mentioned by way of illustration only. The coagulating effect of copper salts resides, of course, in their double charged copper cation. Therefore, any soluble copper salt that has a double charged copper cation will have a coagulating effect on casein glue and increase its water-resistance accordingly. That this is so is proved by the fact that we have used cupric sulfate and cupric nitrate, etc. with substantially the same results as cupric chloride.

Our glue is made by mixing one (1) part by weight of casein, two (2) parts of water, fifteen thousandths (.015) parts of a hydro-carbon oil, two tenths (.2) part of water-slaked lime mixed with one (1) part of water, and seventy hundredths (.70) part of silicate of soda; to which, when mixed, is added three hundredths (.03) part of cupric chloride dissolved in three tenths (.3) of a part of water.

In carrying out our invention we dissolve in a small amount of water three-hundredths of a part of cupric chloride to each part of casein in the original casein glue. For this purpose we use about 30 parts of water. The cupric chloride solution is then poured into the casein glue which has been prepared as described in the Butterman patent. The cupric chloride solution may be added all at once or very slowly in droplets. In either case, however, the casein glue must be stirred constantly in order to break up and disperse the lumps formed by coagulation where the copper solution and casein glue meet.

We have found that copper salts have a pronounced beneficial effect when they are added to the finished casein glue. They can be added to the glue, however, at any stage in its preparation. They can even be added to the casein before any of the other ingredients of the glue. In fact it is sometimes desirable to add the copper solution directly to the casein, as a thin glue which does not "set" or jell for an exceptionally long time, can be prepared in this way.

While we specifically mention the casein glue disclosed in Butterman's Patent No. 1,291,396 in connection with the use of copper salts we do not wish to limit ourselves to the specific proportions given in the patent mentioned because we have found that copper salts will increase the water resistance of any glue made of casein, lime, sodium silicate and water, although it has been our observation that the beneficial effect of a copper salt is greatest in those glues that contain the lowest amounts of lime. One peculiar advantage resulting from the use of copper salts is the fact that the addition of an amount of cupric chloride sufficient to bring about a certain increase in water resistance will not make the glue "set" and jell as quickly as the addition of such an amount of calcium hydroxide as would produce the same increase in water resistance.

What we claim is:

1. A composition of matter comprising casein, lime, silicate of soda, cupric chloride and water.

2. A composition of matter comprising casein, lime, dry soluble silicate of soda, a hydrocarbon oil, and cupric chloride.

3. A composition of matter comprising casein, lime, hydrocarbon oil, silicate of soda, water and cupric chloride.

4. A composition of matter comprising by weight approximately one (1) part of casein, two (2) parts of water, fifteen thousandths (.015) parts of a hydrocarbon oil, two tenths of a part (.2) of water-slaked lime mixed with one part of water, seventy hundredths (.70) part of silicate of soda, three hundredths (.03) part of cupric chloride dissolved in three tenths of a part (.3) of water.

5. A composition of matter comprising casein, lime, water, silicate of soda and a copper salt that has a coagulating effect on the glue and gives in aqueous solution a double charged copper cation.

6. The herein described method of preparing an adhesive by adding an aqueous solution of cupric chloride to a glue comprising one (1) part of casein, two (2) parts of water, fifteen thousandths (.015) part hydrocarbon oil, two tenths of a part (.2) of powdered water-slaked lime, mixed in one (1) part of water and seventy hundredths (.70) parts silicate of soda.

7. The herein described method of adding any copper salt that has a coagulating effect on the glue and gives in aqueous solution a double charged copper cation to a glue comprising one (1) part of casein, two (2) parts of water, fifteen thousandths (.015) part hydrocarbon oil, two tenths of a part (.2) of powdered water-slaked lime mixed in one (1) part of water, and seventy hundredths (.70) parts silicate of soda.

In testimony whereof we have hereunto affixed our signatures.

SAMUEL BUTTERMAN.
CHARLES K. COOPERRIDER.